(12) United States Patent
Hsieh et al.

(10) Patent No.: US 8,588,471 B2
(45) Date of Patent: Nov. 19, 2013

(54) METHOD AND DEVICE OF MAPPING AND LOCALIZATION METHOD USING THE SAME

(75) Inventors: Hsiang-Wen Hsieh, Hsinchu County (TW); Hung-Hsiu Yu, Changhua County (TW); Yu-Kuen Tsai, Taipei County (TW); Wei-Han Wang, Taipei (TW); Chin-Chia Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 715 days.

(21) Appl. No.: 12/699,900

(22) Filed: Feb. 4, 2010

(65) Prior Publication Data

US 2011/0123135 A1    May 26, 2011

(30) Foreign Application Priority Data

Nov. 24, 2009    (TW) .............................. 98140007 A

(51) Int. Cl.
*G06K 9/00* (2006.01)
*G06K 9/36* (2006.01)
(52) U.S. Cl.
USPC ........... 382/106; 382/113; 382/154; 382/181; 382/285; 382/291; 701/448; 701/223
(58) Field of Classification Search
USPC .......... 382/106, 113, 154, 181, 285; 701/448, 701/223
See application file for complete search history.

(56) References Cited

U.S. PATENT DOCUMENTS

| 7,162,338 | B2 | 1/2007 | Goncalves et al. | |
|---|---|---|---|---|
| 7,765,499 | B2 * | 7/2010 | De Graeve et al. | 706/20 |
| 2005/0182518 | A1 | 8/2005 | Karlsson | |
| 2006/0027404 | A1 * | 2/2006 | Foxlin | 178/18.06 |
| 2007/0139262 | A1 * | 6/2007 | Scherzinger | 342/357.02 |
| 2008/0027591 | A1 * | 1/2008 | Lenser et al. | 701/2 |
| 2010/0208033 | A1 * | 8/2010 | Edge et al. | 348/46 |
| 2010/0283778 | A1 * | 11/2010 | Tapang | 345/419 |

FOREIGN PATENT DOCUMENTS

| CN | 1569558 | 1/2005 |
|---|---|---|
| DE | 102007013023 | 9/2008 |
| EP | 1176393 | 1/2002 |
| JP | 2004348575 | 12/2004 |
| JP | 2005077385 | 3/2005 |
| JP | 2007322138 | 12/2007 |

(Continued)

OTHER PUBLICATIONS

Se, et al. "Vision-Based Global Localization and Mapping for Mobile Robots." IEEE Transactions on Robotics. 21.3 (2005): 364-375. Print.*

(Continued)

*Primary Examiner* — Michael A Newman
(74) *Attorney, Agent, or Firm* — Jianq Chyun IP Office

(57) ABSTRACT

A mapping method is provided. The environment is scanned to obtain depth information of environmental obstacles. The image of the environment is captured to generate an image plane. The depth information of environmental obstacles is projected onto the image plane, so as to obtain projection positions. At least one feature vector is calculated from a predetermined range around each projection position. The environmental obstacle depth information and the environmental feature vector are merged to generate a sub-map at a certain time point. Sub-maps at all time points are combined to generate a map. In addition, a localization method using the map is also provided.

14 Claims, 8 Drawing Sheets

(56) References Cited

FOREIGN PATENT DOCUMENTS

| JP | 2009204615 | 9/2009 |
|---|---|---|
| JP | 2010510559 | 4/2010 |
| TW | 200706902 | 2/2007 |

OTHER PUBLICATIONS

Bennewitz, et al. "Metric Localization with Scale-Invariant Visual Features using a Single Perspective Camera." Proceedings of European Robotics Symposium. (2006): 143-157. Print.*

Jensen, et al. "Laser Range Imaging using Mobile Robots: From Pose Estimation to 3d-Models." Proc. 1st Range Imaging Research Day. (2005): 129-144. Print.*

Weiss, et al. "Automatic Generation of Indoor VR-Models by a Mobile Robot with a Laser Range Finder and a Color Camera." Proceeding of: Autonome Mobile Systeme. 19. (2005): 1-7. Print.*

Biber, et al. "3D Modeling of Indoor Environments by a Mobile Robot with a Laser Scanner and Panoramic Camera." Proceedings of 2004 International Conference on Intelligent Robots and Systems. (2004): 3430-3435. Print.*

Zhao, et al. "Updating digital geographic database using vehicle-borne laser scanners and line cameras." Photogrammetric Engineering & Remote Sensing. 71.4 (2005): 415-424. Print.*

Agrawal, et al. "Large-scale 3D scene modeling by registration of laser range data with Google Maps images." Image Processing (ICIP), 2009 16th IEEE International Conference on. (2009): 589-592. Print.*

Stamos, et al. "Integrating Automated Range Registration with Multiview Geometry for the Photorealistic Modeling of Large-Scale Scenes." International Journal of Computer Vision. 78. (2008): 237-260. Print.*

Schmitt, et al. "Vision-based Self-Localization of a Mobile Robot Using a Virtual Environment." Robotics and Automation, 1999. Proceedings. 1999 IEEE International Conference on. 4. (1999): 2911-2916. Print.*

Zhuang, et al. "Mobile Robot Indoor Navigation using Laser Range Finder and Monocular Vision." Robotics, Intelligent Systems and Signal Processing, 2003. Proceedings. 2003 IEEE International Conference on. 1. (2003): 77-82. Print.*

Se et al. "Vision-Based Global Localization and Mapping for Mobile Robots." IEEE Transactions on Robotics. 21.3 (2005): 364-375. Print.*

Bennewitz et al. "Metric Localization with Scale-Invariant Visual Features using a Single Perspective Camera." Proceedings of European Robotics Symposium. (2006): 143-157. Print.*

Masahiro Tomono, Building an Object Map for Mobile Robots using LRF Scan Matching and Vision-based Object Recognition, 2004 IEEE International Conference on Robotics and Automation, 2004. Proceedings (ICRA '04). vol. 4, Apr. 26-May 1, 2004 pp. 3765-3770 vol. 4.

P. Moghadam, W. S. Wijesoma, and D. J. Feng, "Improving Path Planning and Mapping Based on Stereo Vision and Lidar", 10th International Conference on Control, Automation, Robotics and Vision, 2008 (ICARCV 2008). Dec. 17-20, 2008 pp. 384-389.

A. Murarka, J. Modayil, and B. Kuipers, "Building Local Safety Maps for a Wheelchair Robot using Vision and Lasers", Proceedings of the 3rd Canadian Conference on Computer and Robot Vision (CRV '06). Jun. 7-9, 2006 pp. 25-25. Digital Object Identifier 10,. 1109/CRV.2006.20.

"Office Action of Japan Counterpart Application", issued on Jul. 17, 2012, p.1-p.3.

"Office Action of Taiwan Counterpart Application", issued on Nov. 21, 2012, p.1-p.23.

Fang Fang, et al, "A multi-sensor fusion SLAM approach for mobile robots", IEEE, International Conference on Mechatronics and Automation, Jul. 2005, pp. 1837-1841.

* cited by examiner

```
Created by Steffen's Scan Studio.
2D-Map
MinPos:-1286 -6430
MaxPos:6421 3441
NumPoints:6441
LineMinPos:-1271 -2519
LineMaxPos:6412 3390
NumLines:17
LINES
1823 -1482 2924 -1478
564 2663 -857 2657
-1270 3389 -1260 867
-632 855 -629 184
1324 2707 575 2805
6411 -2518 6399 330
1691 2637 1320 2635
3518 2687 3140 2941
6398 2232 6394 3293
3562 3375 2451 3370
2075 2633 1691 2632
2562 -762 3109 -760
-1249 163 -1246 -626
-548 -623 -546 -1182
562 -1542 898 -1540
-1246 -626 -548 -623
-232 -884 59 -918
DATA
117 -798
940 -5819
1140 -6359
1255 -6365
512 -2323
1410 -6030
1425 -5644
1528 -5636
649 -2068
529 -1574
```

FIG. 1A (RELATED ART)

METHOD AND DEVICE OF MAPPING AND LOCALIZATION METHOD USING THE SAME

CROSS-REFERENCE TO RELATED APPLICATION

This application claims the priority benefit of Taiwan application serial no. 98140007, filed on Nov. 24, 2009. The entirety of the above-mentioned patent application is hereby incorporated by reference herein and made a part of this specification.

BACKGROUND OF THE INVENTION

1. Field of the Invention

The present invention relates to a mapping and localization method. More particularly, the present invention relates to a mapping and localization method combining with range data and image feature points.

2. Description of Related Art

A localization and navigation technique is used to estimate poses of a mobile platform moving in an actual environment, so as to achieve an accurate and stable navigation of the mobile platform. Such technique includes two main types, one is to establish an environmental digital map, and such map is taken as reference information for localizing the mobile platform, another is to simultaneously perform localization and construct the digital map during a motion process of the mobile platform (i.e., a simultaneous localization and mapping (SLAM) technique) without constructing the digital map in advance.

A technique for constructing the digital map is to first collect environmental obstacle information through a general range device deployed on the mobile platform, so as to obtain positions of obstacles in the space relative to the mobile platform, for example, coordinates information shown in FIG. 1A. Then, by collecting the spatial position information of the obstacles, the environmental digital map is gradually constructed as that shown in FIG. 1B, in which the coordinates information is converted into depth (profile) information. After the environmental digital map is constructed, the mobile platform collects the environmental information through the general range device during the motion process, and further compares the environmental information to the map for estimating its pose. As shown in FIG. 2, A represents a current pose estimate of the mobile platform, when dot line parts are overlapped to circle parts, it represents that the pose estimate of the mobile platform is in accordance with a current environmental state, and when the dot line parts and the circle parts are greatly deviated, it represents that the mobile platform cannot confirm its current correct pose.

According to the SLAM technique, mapping of the environment is not performed in advance, and during the motion process of the mobile platform, environmental features or landmarks are detected through a general range device or a visual device to serve as the reference information of the map, so as to achieve localization. During the motion process of the mobile platform, recognizable features in the environment are detected, and degree of reliability of the detected feature or landmark position is represented by an uncertainty distribution. Such technique achieves the localization function by continually detecting the environmental features and the corresponding positions in the space.

According to the above conventional localization technique of the mobile platform, regarding the first type of technique, accurate localization can be achieved only through the same type of range sensing device used for constructing the digital map. When the digital map is constructed through a high-accuracy and expensive general range device (for example, a commonly used laser range finder), the mobile platforms having the accurate localization and navigation demand in the environment are all required to equip such type of the general range device, and therefore a hardware cost of the mobile platform is greatly increased, and a type of the applicable mobile platform is limited. Therefore, whether the constructed environmental digital map can be provided to different kinds of mobile platforms (for example, smart phones, personal navigation devices, etc.) equipped with different sensing devices to implement the localization and navigation function is a key point of whether such technique can be widely applied. Moreover, the SLAM technique implemented through the general range device and the visual device can achieve the localization function only through environmental features detection. However, in an actual application, main problems are that a complicated visual device motion model has to be constructed, and excessive detection uncertainty of the environmental feature positions is liable to be occurred due to rotation, which can influence a stability and accuracy of the localization. Meanwhile, since correspondences between the environmental features cannot be established, the mobile platform cannot determine whether a region between each two environmental features is a passable region during the motion process, so that such technique cannot achieve a navigation function for the mobile platform moving in an actual environment.

European patent No. EP1176393 discloses a device for unmanned automatic underground mining, in which range data from a laser range finder are first collected to establish three-dimensional (3D) map data. Then, an inertial navigation system (INS) and vision sensor are used to localize the device. A principle thereof is that the INS is first used to estimate the pose of the device, and then the 3D map data around the pose is compared to feature points scanned by vision sensor, so as to correct the error of pose estimate. According to such patent, when the map is constructed, only range data from laser range finder are used, and an association between the range data and the image data are not established. Moreover, during the localization, the INS is required to estimate pose of the device.

P. Moghadam et al. (non-patent document 1) and Murarka et al. (non-patent document 2) provide a technique of constructing the environmental map by combining a laser range finder and stereo vision. According to such technique, 3D spatial depth information calculated based on the 3D image data are projected to a 2D plane, and a 2D map generated by projecting 3D images is combined with a 2D map constructed by the laser range finder to complete establishing the environmental map. According to such technique, two kinds of maps are combined, though a corresponding relationship thereof is not established, so that when the localization is performed through an individual sensor, a comparison error between captured data and the constructed map is great, which influences localization accuracy.

Non-patent document 1: "*Improving Path Planning and Mapping Based on Stereo Vision and Lidar*", 10*th International Conference on Control, Automation, Robotics and Vision*, 2008 (*ICARCV* 2008). 17-20 Dec. 2008 Page(s):384-389.

Non-patent document 2: "*Building Local Safety Maps for a Wheelchair Robot using Vision and Lasers*", *Proceedings of the* 3*rd Canadian Conference on Computer and Robot Vision* (*CRV'*06). 7-9 Jun. 2006 Page(s):25-25. Digital Object Identifier 10.1109/CRV.2006.20.

SUMMARY OF THE INVENTION

The present invention provides a mapping method. According to the mapping method, an environment is scanned to obtain depth information of environmental obstacles. An image of the environment is captured to generate an image plane. The depth information of environmental obstacles is projected onto the image plane, so as to obtain a plurality of projection positions. At least one feature vector is calculated for each projection position in the image plane. The depth information of environmental obstacles and the feature vectors are combined to generate a sub-map for a certain time point. The sub-maps at all time points are combined to generate the entire digital map.

The present invention provides a localization method. First, a map is obtained, wherein the map includes depth information of environmental obstacles and at least one feature vector of an image corresponding to the environmental obstacle. Next, an environmental image is obtained through a visual sensing device. Next, at least one image feature point is extracted from the environmental image. Next, localization is performed according to the image feature points and the map.

The present invention provides a mapping device comprising at least one range sensing device, at least one visual sensing device and an image processing device. The range sensing device is used for collecting depth information of environmental obstacles. The visual sensing device captures an image of the environment to generate an image plane. The image processing device is coupled to the range sensing device and the visual sensing device, and is used for projecting the depth information of environmental obstacles onto the image plane to obtain a plurality of projection positions, calculating at least one feature vector from each projection position in the image plane, and combining the depth information environmental obstacles and the feature vectors to generated a map.

According to the above description, a method of constructing a block feature map and a localization method are provided. During a process of constructing the map according to the depth information of environmental obstacles obtained by the range sensing device, the visual sensing device is further used to obtain block feature data of an image corresponding to the actual environment. The block feature map is constructed according to a corresponding relationship between range data provided by the range sensing device and the block feature data of the image. After the block feature map is constructed, localization and navigation of a mobile platform can be achieved by only comparing environmental features captured by the visual sensing device with the constructed map.

In order to make the aforementioned and other features of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 1A and 1B are schematic diagrams illustrating a conventional mapping method.

DESCRIPTION OF THE EMBODIMENTS

The present invention combines a sensing-merged mapping technique with an image localization technique to provide an innovative sensing-merged mapping technique, which merges sensor information of a visual sensing device and a range sensing device to accomplish a map construction. The constructed map can not only be provided to a mobile platform having the range sensing device to implement localization, but can also be provided to a mobile platform having a low cost visual sensing device to implement localization and navigation. Therefore, problems of poor stability and unfeasibility of navigation for the SLAM technique only performed through the visual sensing device can be resolved.

First, a block feature mapping technique is described.

Figure 1B:
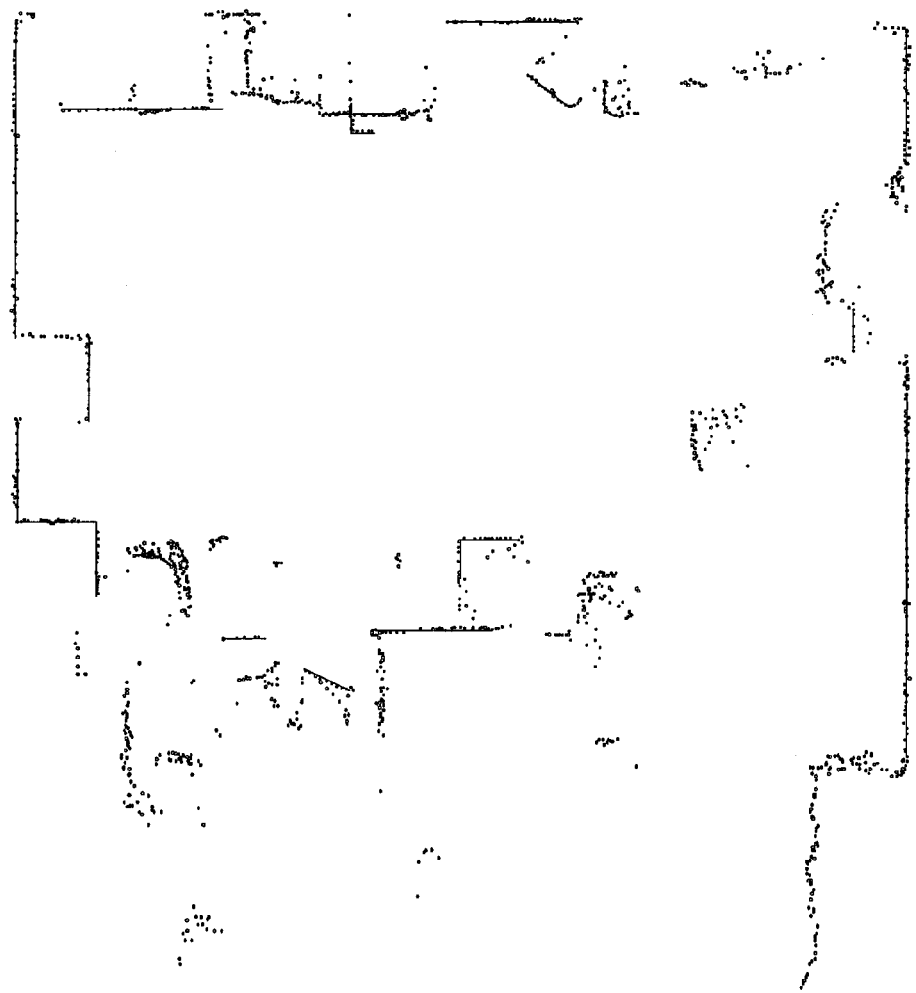
Figure 2:
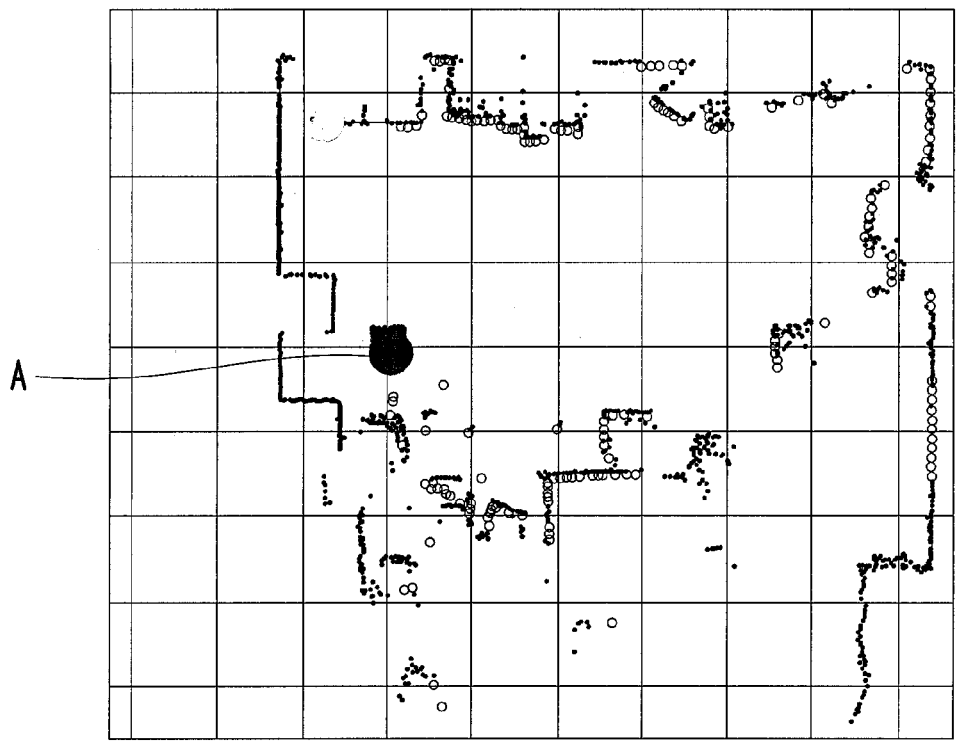
FIG. 2 is a schematic diagram illustrating a conventional localization method.
Figure 3:
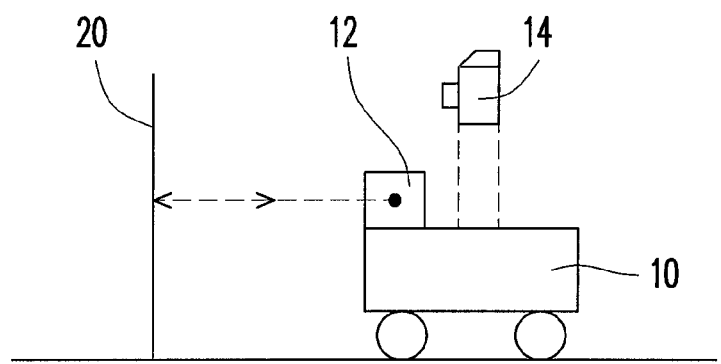
FIG. 3 is a schematic diagram illustrating a hardware structure used for mapping according to an embodiment of the present invention.

FIG. 3 is a schematic diagram illustrating a hardware structure used for mapping. As shown in FIG. 3, the hardware structure used for mapping comprises a range sensing 12 and a visual sensing device 14, which can be carried on a mobile platform 10. The range sensing device 12 is, for example, a laser range finder, which can perform scanning with laser beams, so as to obtain arrange data from an environmental obstacle 20, and establish an environmental obstacle depth (profile) information. The visual sensing device 14 is, for example, a digital camera, which is used for obtaining image data of the environment. The hardware structure can further comprise a data processing device, which can be deployed on the mobile platform 10 for processing a mapping procedure, or can process the mapping procedure in a remote control manner.

In brief, the mapping procedure is, for example, to obtain accurate environmental obstacle depth (profile) information first through the range sensing device 12. Then, depth information of environmental obstacles is projected onto an image plane of an image captured by the visual sensing device 14. Feature points of corresponding positions on the image plane are calculated, so as to obtain a measurement correspondence between the environmental obstacle depth and the image information.

When the mobile platform 10 moves, distance measurement values detected by the range sensing device 12 (for example, a laser range finder) and image data captured by the visual sensing 14 (for example, a general digital camera) are used for mapping. After the mapping process is completed, localization of the mobile platform 10 can be achieved by only comparing environmental image features with the constructed block feature map, wherein the environmental image features are obtained by analysing environmental images captured by the visual sensing device 14 on the mobile platform 10.

Figure 4:
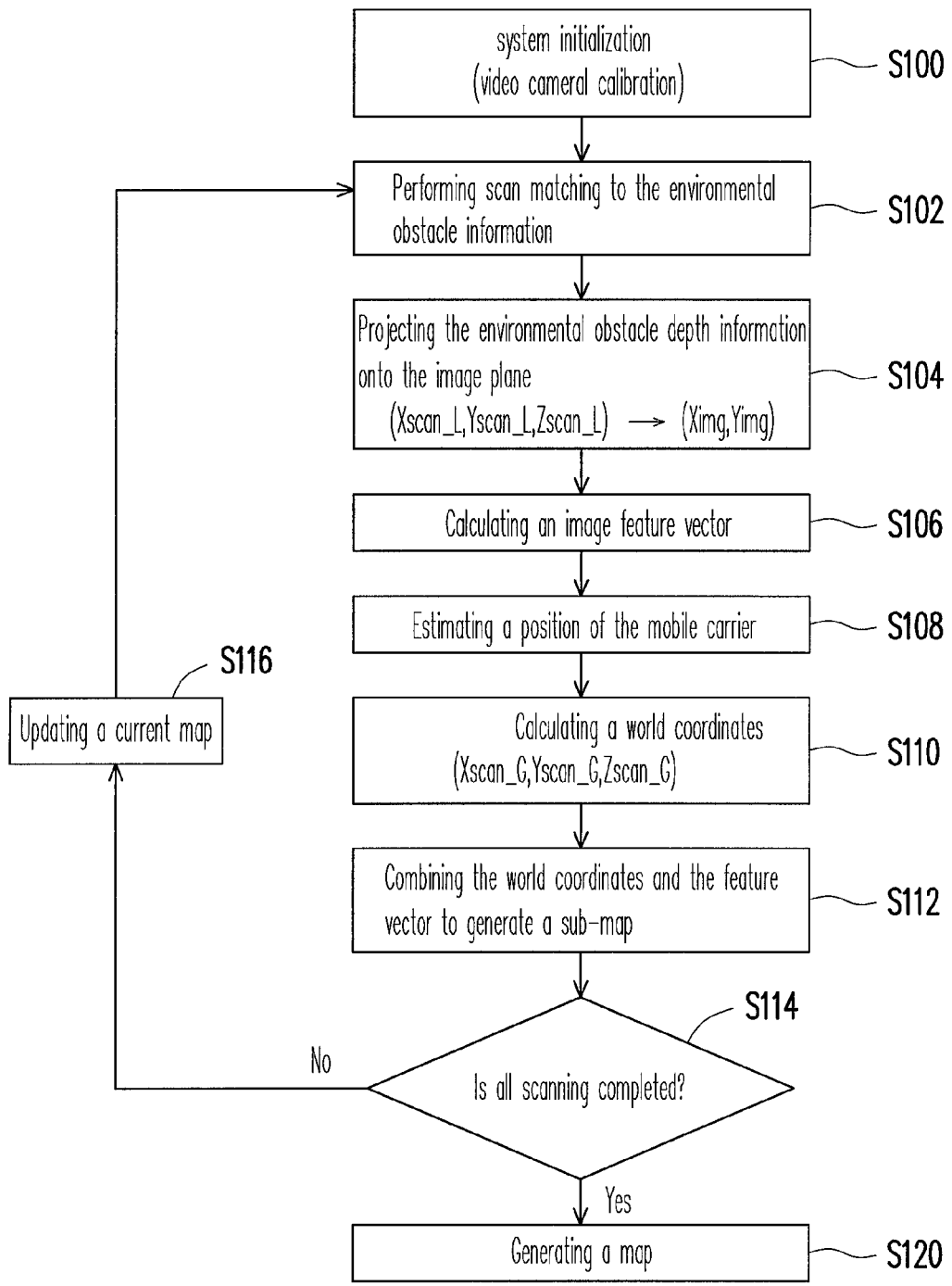
FIG. 4 is a flowchart illustrating a mapping method according to an embodiment of the present invention.

FIG. 4 is a flowchart illustrating a mapping method according to an embodiment of the present invention. In step S100, system is initiated, and during the initialisation stage, calibration of the visual sensing device 14 (for example, a digital camera) has to be performed in advance, so as to obtain intrinsic parameters of the visual sensing device 14. Here, K represents a 3×3 matrix of the intrinsic parameters.

For example, a point in the space can be projected to a certain position on the image plane obtained by the visual sensing device 14 according to information of the intrinsic parameters K. Spatial relative relationships of the visual sensing device 14 and the range sensing device 12 can be represented by a 3×3 rotation matrix $R_c$ and a 3×1 displacement matrix $T_c$. These parameters are used to project the environmental obstacle depth information detected by the range sensing device 12 onto the image plane, as shown in a following equation (1):

$$XIMG = K[R_c[XSCAN\_L] + T_c] \quad (1)$$

Where, XIMG represents image coordinate information, and XIMG=(u,v) can be used to represent a position on the image plane. $R_c$ and $T_c$ respectively represent rotation and displacement relationships of the visual sensing device and the range sensing device. K represents the intrinsic parameters of the visual sensing device, which can be represented by a following matrix, wherein $(f_u, f_v)$ represents a focal length of the visual sensing device, $(c_u, c_v)$ represents an image central position, s represents an image distortion parameter, etc.

$$K = \begin{bmatrix} f_u & s & c_u \\ 0 & f_v & c_v \\ 0 & 0 & 1 \end{bmatrix}$$

Next, in step S102, scan matching of the environmental obstacle information is performed. The range sensing device 12 performs a certain angle range scan through the laser beams at a time point, so as to obtain obstacle depth information of the environmental of such time point; namely, after distance information is obtained through the scan operation, profile information of the environmental obstacle in the space is obtained.

Then, obstacle depth information of the environmental detected by the range sensing device 12 at two time points are compared to calculate a current movement amount of the mobile platform 10. A method for calculating the movement amount is conducted by the following equation (2).

$$XSCAN\_L_t = R_s \cdot XSCAN\_L_{t-1} + T_s \quad (2)$$

Where, XSCAN_L represents a spatial position of the environmental obstacle relative to a coordinate axis of the range sensing device 12. $R_s$ and $T_s$ respectively represent a rotation amount and a linear translation amount of a current sensing result relative to a sensing result of a previous time point.

Figure 5A:
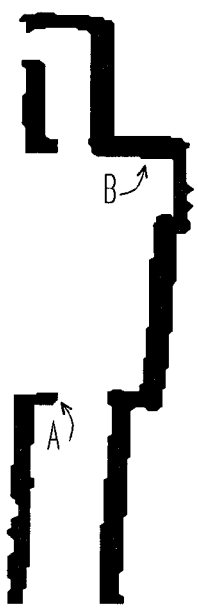
FIGS. 5A and 5B are schematic diagrams of projecting depth information of environmental obstacles onto an image plane.
Figure 5B:
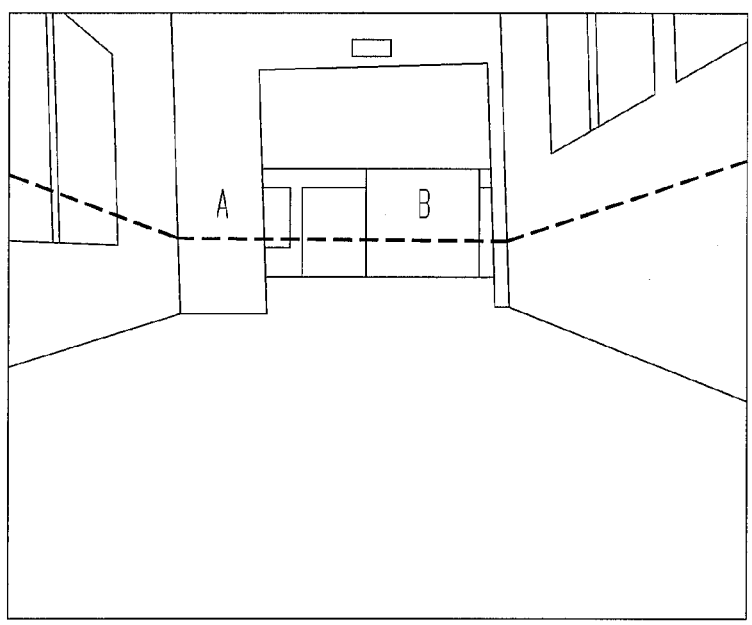

Next, in step S104, the spatial information and the image information are correspondingly integrated, i.e., the depth information of environmental obstacles (equation (3)) detected by the range sensing device 12 are projected onto the image plane (equation (4)) obtained by the visual sensing device 14. FIG. 5A is a diagram illustrating depth information of environmental obstacles (i.e., a profile of the environmental obstacle) detected by the range sensing device 12 at a certain time point. FIG. 5B is a diagram illustrating an image obtained by the visual sensing device 14 at the same time point. An image plane established according to the image is represented by image coordinates XIMG=(u,v). A dot line in FIG. 5B represents a result of projecting the depth information of environmental obstacles onto the image plane. Namely, the dot line represents corresponding positions of the environmental obstacles of FIG. 5A on the image plane. For example, positions A and B in FIG. 5B respectively correspond to positions A and B of FIG. 5A.

$$XSCAN\_L = (Xscan\_Lx, Yscan\_Ly, Zscan\_Lz) \quad (3)$$

$$XIMG = (u, v) \quad (4)$$

Next, in step S106, feature vectors on the image plane are calculated. According to a result of the step S104, after a plurality of projection positions on the image plane is confirmed, image information within a range of M×M pixels around each of the projection positions is calculated, so as to extract an image feature position.

Figure 6:
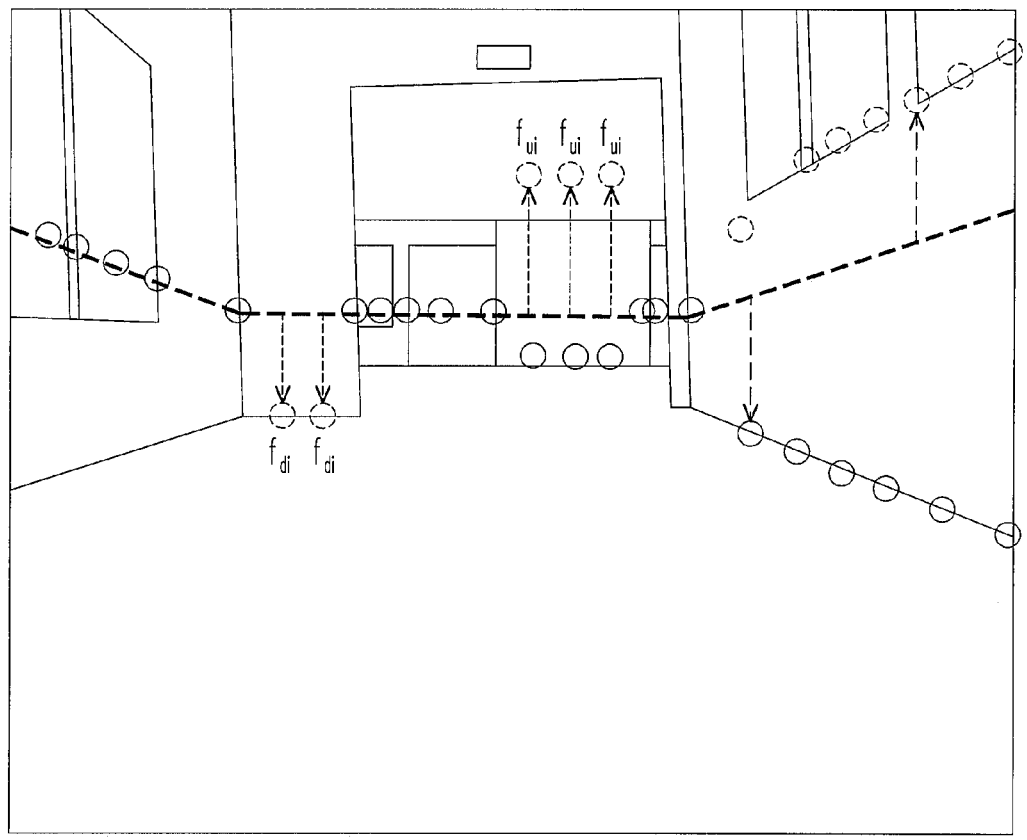
FIG. 6 is a schematic diagram illustrating determination of image feature positions.

FIG. 6 is a schematic diagram illustrating determination of image feature positions. As shown in FIG. 6, the image feature positions can be determined by calculating corner points, edges and regional extremum, etc., and a feature vector $f_i$ can be used to represent the a detected environmental feature on the image. When a suitable feature vector $f_i$ cannot be found, an upper feature vector $fu_i$ or a lower feature vector $fd_i$ is further searched, as shown in FIG. 6.

In the above feature vectors, the feature vectors $f_i$ represents a feature vector of a distance measurement value in the image that is extracted relative to the projection position, which can be represented by $(f_{i1}, f_{i2}, f_{i3}, \ldots, f_{iN})$, where N represents a dimension of the feature vector.

The upper feature vectors $fu_i$ represents a feature vector of a distance measurement value in the image that is extracted from a position above a vertical axis of the projection position, which can be represented by $(fu_{i1}, fu_{i2}, fu_{i3}, \ldots fu_{iN})$. The lower feature vectors $fd_i$ represents a feature vector of a distance measurement value in the image that is extracted from a position below a vertical axis of the projection position, which can be represented by $(fd_{i1}, fd_{i2}, fd_{i3}, \ldots, fd_{iN})$.

The principle for choosing the feature vector is mainly based on distinctiveness and tolerance for angle variations, etc. If a calculated environmental feature vector is highly similar to its adjacent feature vector, such feature vector is abandoned, so as to avoid increasing a recognition difficulty.

Next, in step S108, a pose of the mobile platform 10 is estimated. In this step, the position and angle information of the mobile platform 10 at a current time point t can be estimated according to a position estimation of the mobile platform 10 at a previous time point t-1 and a comparison result of the step S102. An estimation result of the pose of the mobile platform 10 at the time point t can be represented by coordinates $POS(t) = (x_t, y_t, \theta_t)$, wherein $(x_t, y_t)$ represents the position, and $\theta_t$ represents an angle.

In step S110, the depth information of environmental obstacles is converted into a world coordinate system. Namely, the depth information of environmental obstacles of the current time point t is converted into the world coordinate system, as shown in a following equation (5). Where, $XSCAN\_G_t$ represents a spatial position of the environmental obstacle in the world coordinate system, which can be represented by a $(x_i, y_i, z_i)$ coordinate system, wherein i=1 to N, and N represents a number of the environmental obstacles (or a number of scan points of a cycle).

$$XSCAN\_{Gt} = (scan\_G_x, scan\_G_y, scan\_G_z) \quad (5)$$

Next, in step S112, the world coordinates and the feature vectors of the image plane are combined. In the step S112, the environmental feature vectors $f_i$, $fu_i$, $fd_i$ in the image that are calculated according to the step S106 are combined with the world coordinate system of the depth information of environmental obstacles, so as to generate a sub-map information $MAP_t$ for the time point t. The sub-map information $MAP_t$ can be represented by the following equation (6).

$$MAP_t=([XSCAN\_G_1,f_1,fu_1,fd_1],[XSCAN\_G_2,f_2,fu_2, fd_2],\ldots,[XSCAN\_G_N,f_N,fu_N,fd_N]) \quad (6)$$

According to the equation (6), it is obvious that the constructed map of the present embodiment comprises the depth information of environmental obstacles (represented by the world coordinates) and the environmental feature vector information (the feature vectors corresponding to the feature points in the depth information) of the image plane for each time point. In other words, in addition to the depth information of environmental obstacles used in a general map, the constructed map of the present embodiment further comprises the environmental feature vector information presented by the image.

Next, in step S114, whether all of the depth information of environmental obstacles is scanned is determined. If yes, step S120 is executed to combine all of the sub-maps to generate a map MAP, which can be represented by the following equation (7).

$$\Sigma MAP_t \quad (7)$$

The equation (7) represents a map result after the depth information of environmental obstacles of all time points are combined to the image feature vectors.

Conversely, if it is determined that the scan is not complete according to the step S114, a step S116 is executed to update the current map, and the step S102 is repeated to continually execute the steps S102-S114 until scan of the environmental obstacles is complete.

In summary, the constructed map of the present embodiment contains the depth information of environmental obstacles and the image feature vectors, so that during the localization, the sensors that can be used for localizing are diversified. Therefore, even if only the video camera is used to capture the images, the localization can still be performed through the feature vector information in the map without using the actual depth information of environmental obstacles, so that inconvenience of a conventional localization technique that the same type of sensing device used for mapping has to be used can be avoided.

Then, a localization method using the map constructed according to the aforementioned mapping method is described below.

Figure 7:
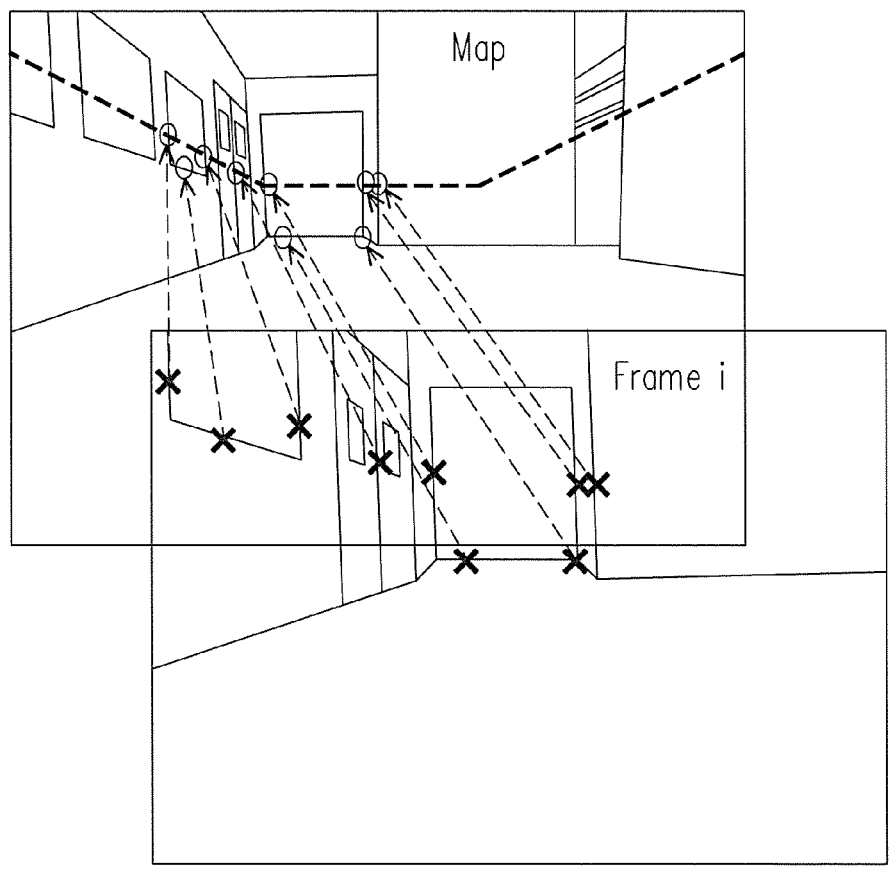
FIG. 7 is a diagram illustrating an image frame and corresponding map information used for localization.
Figure 8:
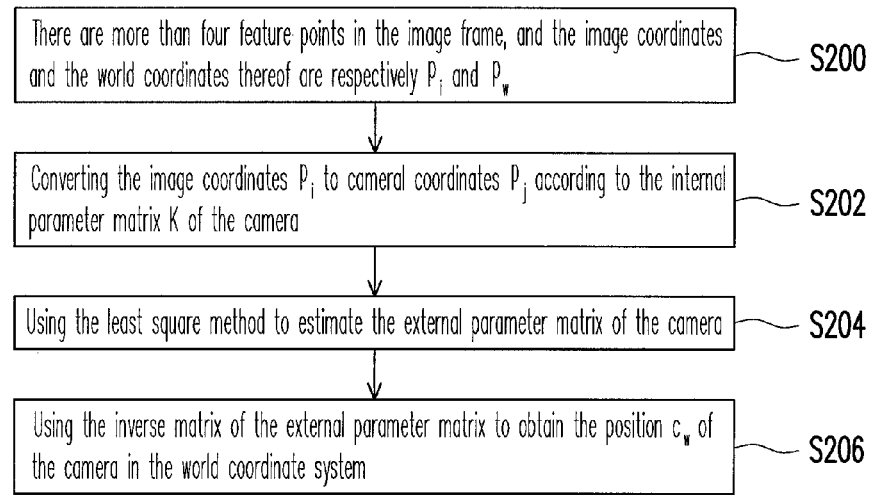
FIG. 8 is a flowchart illustrating a localization method according to an embodiment of the present invention.

FIG. 7 is a diagram illustrating an image frame and corresponding map information used for localization. FIG. 8 is a flowchart illustrating a localization method according to an embodiment of the present invention. Here, assuming the map is already constructed according to the aforementioned mapping method.

According to FIG. 7 and the above equation (6), an digital map format of the present embodiment comprises spatial positions $p_i$ (the profile depth information (dot line) and positions marked with "O" in the map of FIG. 7) of the obstacles in the space and the feature vectors $f_i$, $fu_i$, $fd_i$ (positions marked with "x" in a frame i of FIG. 7) of the projection positions on the image plane. Therefore, when the mobile platform is only equipped with the visual sensing device and the calibration of the visual sensing device is completed to obtain the intrinsic parameters K, the image feature points are compared with its world coordinate positions $p_w(x, y, z, 1)$ in the constructed digital map according to the captured environmental image feature point positions $p_i(u, v, 1)$.

In this way, an extrinsic parameter matrix T of the visual sensing device can be further deduced to obtain the position information $C_W$ (the world coordinates) of the mobile platform.

Then, the localization method is further described with reference of the flowchart shown in FIG. 8. Referring to FIG. 8, in step S200, taking FIG. 7 as an example, there are more than four feature points in the image frame i, and the image coordinates and the world coordinates thereof are respectively $p_i$ and $p_w$. A corresponding relationship between the image coordinates and the world coordinates can be represented by the following equation (8), where R and T are respectively a rotation matrix and a translation matrix.

$$p_I = \begin{bmatrix} f_u & s & c_u \\ 0 & f_v & c_v \\ 0 & 0 & 1 \end{bmatrix}[I|0]\begin{bmatrix} R & t \\ 0 & 1 \end{bmatrix}p_W = KPTp_W \quad (8)$$

Next, in step S202, a point pi in the image coordinates is converted into the point pj in camera coordinates with the intrinsic parameter matrix K of the visual sensing device.

In this step, the coordinates $p_I$ in the image is projected to a position $p_J$ of the coordinate system of the visual sensing device. The projection equation is as the following equation (9). An equation (10) can be obtained by substituting the equation (9) into the equation (8).

$$p_J = K^{-1}p_I \quad (9)$$

$$p_J = PTp_W = [Rt]p_W = Mp_w \quad (10)$$

Next, in step S204, a least square method is used to estimate the extrinsic parameter matrix T of the visual sensing device. Here, the projection matrix P and the extrinsic parameter matrix T are merged into a matrix M (equation (10)), and thus solving the external parameter matrix T is equivalent to solving a linear system. The least square method is used to obtain a solution M=[R t] of the extrinsic parameters of the visual sensing device, so as to satisfy a minimization of the following equation (11). Moreover, the external parameter matrix T includes the rotation matrix R and the displacement matrix t, which can be represented by a following equation (12).

$$\sum_k (Mp_w^k - p_j^k)^2 \quad (11)$$

$$T = \begin{bmatrix} R & t \\ 0 & 1 \end{bmatrix} \quad (12)$$

In step S206, the position $c_w$ of the visual sensing device in the world coordinate system can be obtained by using an inverse matrix of the extrinsic parameter matrix T. In the coordinate system of the visual sensing device, the position of the visual sensing device is an origin (0, 0, 0) of such coordinate system. In the world coordinate system, the world coordinate position $c_w$ of the visual sensing device can be represented by the inverse matrix (13) of the external parameter matrix T.

$$c_w = \begin{bmatrix} R & t \\ 0 & 1 \end{bmatrix}\begin{bmatrix} 0 \\ 1 \end{bmatrix} = \begin{bmatrix} t \\ 1 \end{bmatrix} \quad (13)$$

Moreover, angle changes of the visual sensing device can be deduced from two sequential images captured at adjacent time points. Assuming the visual sensing device only performs an in-situ rotation, the two sequential images have the same feature points. If the feature point image coordinates of a first time point is $p_1$, and the feature point image coordinates of a second time point is $p_2$, the angle change θ of the visual sensing device then can be calculated according to a distance difference between $p_2$ and $p_1$ and the focal length f of the visual sensing device.

According to the aforementioned steps S200 to S206, the localization can be conducted based on the map constructed according to the flowchart of FIG. 4. As described above, during the map construction, the depth information of environmental obstacles (profile) and the image feature point information are integrated within the map. Therefore, during the localization, even if a corresponding range sensing device is not equipped to the mobile platform and only the visual sensing device is used to obtain the image feature points, the feature points can be compared to the constructed map to achieve an accurate localization. Therefore, the localization and navigation function can be provided to the mobile platform only equipped with the low cost visual sensing device, so as to solve problems of poor stability and unfeasibility of navigation that caused by implementing the SLAM technique only through the visual sensing device.

Figure 9:
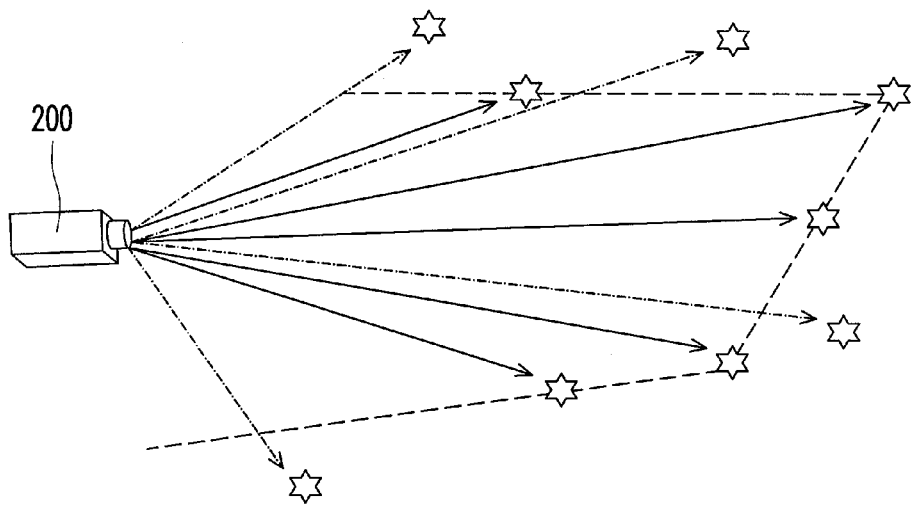
FIG. 9 is a schematic diagram illustrating an embedded handheld system according to an embodiment of the present invention.

Variations of the embodiment are provided below. In the above embodiments, various sensors are deployed on the mobile platform. However, the mapping method can also be applied to an embedded handheld device, as shown in FIG. 9. FIG. 9 is a schematic diagram illustrating an embedded handheld system 200 integrating the range sensing device and the visual sensing device. With such structure, in addition to the aforementioned 2D mapping and mobile platform localization, a mobile feature of the handheld device can be further integrated to construct a 3D block feature map, so that the embedded handheld device can serve as a 3D personal navigation device (PND).

In summary, according to the above description, a method of constructing a block feature map and a localization method are provided. During a process of constructing the map according to the depth information of environmental obstacles obtained by the range sensing device, the visual sensing device is further used to obtain block feature data of an image corresponding to the actual environment. The block feature map is constructed according to a corresponding relationship between a distance measurement provided by the range sensing device and the block feature data of the image. After the block feature map is constructed, localization and navigation of a mobile platform can be achieved by only comparing environmental features captured by the visual sensing device with the constructed map.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mapping method, comprising:
    scanning an environment to obtain depth information of environmental obstacles;
    capturing an image of the environment to generate an image plane;
    projecting the enviromnental obstacle depth information onto the image plane, so as to obtain a plurality of projection positions;
    calculating at least one feature vector from a predetermined range around each of the projection positions in the image plane, wherein when the feature vector cannot be calculated from the predetermined range around each of the projection positions, at least an upper feature vector or at least a lower feature vector is calculated from upper or lower image data of each of the projection positions, wherein the upper feature vector or the lower feature vector is calculated according to upper or lower image data in the image plane relative to a vertical axis of each of the projection positions;
    combining the depth information of environmental obstacles and each of the feature vectors to generate a sub-map for a certain time point; and
    combining the sub-maps at all time points to generate a map.

2. The mapping method as claimed in claim 1, wherein the feature vector is determined according to corner points, edges and regional extremum in the predetermined range of each of the projection positions on the image plane.

3. The mapping method as claimed in claim 1, wherein the step of combining the depth information of environmental obstacles and each of the feature vectors comprises:
    converting the depth information of environmental obstacles to a world coordinate system; and
    combining each of the feature vectors with the depth information of environmental obstacles represented by the world coordinate system.

4. The mapping method as claimed in claim 1, wherein the step of calculating the feature vectors according to the projection positions in the image plane further comprises abandoning the feature vectors with high similarities.

5. The mapping method as claimed in claim 1, wherein the step of scanning the environment is performed with a laser range finder.

6. The mapping method as claimed in claim 1, wherein the step of capturing the image of the environment is performed with a digital camera.

7. A localization method, comprising:
    obtaining a map comprising the depth information of environmental obstacles and at least one feature vector of an image corresponding to the depth information of environmental obstacles, wherein the step of obtaining the map comprises:
        scanning an environment to obtain the environmental obstacle depth information;
        capturing an image of the environment to generate an image plane;
        projecting the depth information of environmental obstacles onto the image plane, so as to obtain a plurality of projection positions;
        calculating at least one feature vector from a predetermined range around each of the projection positions in the image plane, wherein when the feature vector cannot be calculated from the predetermined range around each of the projection positions, at least an upper feature vector or at least a lower feature vector is calculated from upper or lower image data of each of the projection positions, wherein the upper feature vector or the lower feature vector is calculated according to upper or lower image data in the image plane relative to a vertical axis of each of the projection positions;

combining the depth information of environmental obstacles and each of the feature vectors to generate a sub-map for a certain time point; and combining the sub-maps at all time points to generate the map;

using a visual sensing device to obtain an environmental image;

extracting at least one image feature point from the environmental image; and performing a localization according to the image feature point and the map.

8. The localization method as claimed in claim 7, wherein the step of performing the localization according to the image feature point and the map is to calculate a world coordinates of the visual sensing device by using an image coordinates and a world coordinates of the image feature point of the environmental image, so as to implement the localization.

9. The localization method as claimed in claim 7, wherein the feature vector is determined according to corner points, edges and regional extremum in the predetermined range of each of the projection positions on the image plane.

10. The localization method as claimed in claim 7, wherein the step of combining the depth information of environmental obstacles and each of the feature vectors comprises:

converting the depth information of environmental obstacles to a world coordinate system; and combining each of the feature vectors with the depth information of environmental obstacles represented by the world coordinate system.

11. A mapping device, comprising:

at least one range sensing device, for scanning an environment to generate the depth information of environmental obstacles;

at least one visual sensing device, for capturing an image of the environment to generate an image plane, wherein the range sensing device and the visual sensing device are integrated as an embedded handheld device; and an image processing device, coupled to the range sensing device and the visual sensing device, for projecting the depth information of environmental obstacles onto the image plane to obtain a plurality of projection positions, calculating at least one feature vector from a predetermined range around each of the projection positions in the image plane, and combining the depth information of environmental obstacles and the feature vectors to generated a map, wherein when the feature vector cannot be calculated from the predetermined range around each of the projection positions, the image processing device further calculates at least an upper feature vector or at least a lower feature vector from upper or lower image data of each of the projection positions, wherein the upper feature vector or the lower feature vector is calculated according to upper or lower image data in the image plane relative to a vertical axis of each of the projection positions.

12. The mapping device as claimed in claim 11, wherein the range sensing device is a laser range finder.

13. The mapping device as claimed in claim 11, wherein the visual sensing device is a digital camera.

14. The mapping device as claimed in claim 11, wherein the range sensing device, the visual sensing device and the image processing device are deployed on a mobile platform.

* * * * *